Patented July 16, 1946

2,403,932

UNITED STATES PATENT OFFICE 2,403,932

A LOW-FREEZING OXIDANT

Walter E. Lawson, Wilmington, Del., assignor to E. I. du Pont de Nemours & Company, Wilmington, Del., a corporation of Delaware No Drawing. Application September 18, 1943, Serial No. 502,993

2 Claims. (Cl. 252—186)

This invention relates to a novel product adapted for use as an oxygen supplier and more particularly to such a material of very desirable physical properties.

Nitrogen tetroxide has the formula $N_2O_4$ or $NO_2$, depending on its physical state, and is capable of supplying oxygen for the combustion of oxidizable materials. Under certain conditions where oxygen of the air is not suitable or available freely, nitrogen tetroxide in liquid form is a very convenient source of oxygen and one that occupies very small volume. It is adaptable for use, for example, as the oxidant in jet motors for the propulsion of rockets, torpedoes, and various craft. Under stratosphere conditions or in other places or seasons where low temperatures prevail, however, nitrogen tetroxide has the disadvantage of a relatively high freezing point such that it may become congealed and difficult to handle.

An object of the present invention is a nitrogen tetroxide product of modified properties and adaptable for satisfactory use under severe low temperature conditions. A further object is such a product of considerably reduced freezing point but not impaired as to oxidizing power. A still further object is a method for preparing such a product. Additional objects will be disclosed as the invention is described more at length hereinafter.

I have found that a chemical product of desirable characteristics is obtained when I introduce nitrous oxide ($N_2O$) into intimate contact with nitrogen tetroxide and obtain a non-gaseous nitrogen tetroxide product containing dissolved or combined nitrous oxide. Preferably I carry out the process by causing liquid or gaseous nitrous oxide to pass into liquid nitrogen tetroxide and become retained therein.

The following examples will serve as specific embodiments of the method of carrying out the process and of obtaining the desired product. It will be understood that the procedures and compositions used are by way of illustration only and are not to be taken as limiting in any way.

Example 1

Gaseous nitrous oxide was caused to bubble through a body of liquid nitrogen tetroxide until an amount was present which subsequently was determined by analysis to amount to 9.5% of the contents. During the introduction of the gas, the liquefied material was surrounded by a freezing mixture. The freezing point of the liquid after addition of the nitrous oxide was found to be $-17.4°$ C., and the boiling point $+26°$ C.

Example 2

A larger amount of nitrous oxide was introduced in similar manner into liquid nitrogen tetroxide by leading the former beneath the liquid surface and causing it to bubble therethrough. The dissolving of the nitrous oxide could be detected by the disappearance of the bubbles of gas as they rose through the liquid. A definite temperature rise likewise took place. The final liquid product contained 41.5% nitrous oxide and had a freezing point of $-51.0°$ C. and a boiling point of $+33°$ C.

From the foregoing it will be seen that the introduction of nitrous oxide into liquid nitrogen tetroxide results in a very considerable lowering of the freezing point. Whereas nitrogen tetroxide alone freezes at $-9.6°$ C., the freezing points when 9.5 and 41.5% nitrous oxide are present are $-17.4°$ C. and $-51.0°$ C., respectively. This will constitute a definite and important advantage if the liquid mixture is to be used at very low temperatures, since it will allow it to remain in the liquid state where otherwise it would become solid and unworkable. The use of nitrous oxide has the advantage that this gas, in addition to being soluble in nitrogen tetroxide, contains readily available oxygen; hence contributes its share of oxidation power when used as a diluent of nitrogen tetroxide.

While nitrous oxide has been spoken of as being dissolved in the liquid nitrogen tetroxide, it seems probable that a certain amount of chemical combination takes place. This is suggested by the effect of nitrous oxide on the boiling point of nitrogen tetroxide. Whereas nitrous oxide by itself boils at around $-89°$ C., the boiling points of blends of 9.5 and 41.5% of this compound with nitrogen tetroxide are $+26°$ C. and $+33°$ C., respectively. In any event the nitrous oxide is satisfactorily retained by the nitrogen tetroxide under temperature and pressure conditions contemplated for its use. While it has been suggested, therefore, that chemical combination of the two compounds may have taken place, the invention is not to be limited in any way by such a theory and will apply equally whether the nitrous oxide is present in physical solution or chemically combined. Desirably I employ between 1 and 50% of nitrous oxide by weight in the non-gaseous nitrogen tetroxide product.

The new product of this invention will have numerous applications, for example as an oxidant for use with hydrocarbon fuels in airplane take-offs and flights, in stratosphere flights, in jet motor propulsion, and for the propulsion of various devices such as rockets, torpedoes, and the like. It is very suitable for use as an oxidant wherever there is an insufficient supply of available oxygen for uses such as those proposed.

While the invention has been described completely in the foregoing, it will be understood that many variations in compositions and applications may be effected without departure from the scope of said invention. I preferably introduce liquid or gaseous nitrous oxide into liquid nitrogen tetroxide and employ this latter in liquid form, but the invention is intended to cover non-gaseous nitrogen tetroxide containing a content of nitrous oxide, whether liquid or solid.

I intend to be limited, therefore, only by the following patent claims:

I claim:

1. A chemical product consisting essentially of nitrogen tetroxide and from approximately 9 to 50% of nitrous oxide.

2. A chemical product consisting essentially of nitrogen tetroxide and nitrous oxide, said nitrogen tetroxide being present in the amount of at least 50% and said nitrous oxide being present in the amount of at least 1%.

WALTER E. LAWSON.

Disclaimer 2,403,932.—*Walter E. Lawson*, Wilmington, Del. A LOW-FREEZING OXIDANT. Patent dated July 16, 1946. Disclaimer filed Feb. 8, 1951, by the assignee, *E. I. du Pont de Nemours and Company*.

Hereby enters this disclaimer to claims 1 and 2 of said patent.

[*Official Gazette March 13, 1951.*]